(12) United States Patent
Cadle et al.

(10) Patent No.: US 6,626,576 B1
(45) Date of Patent: Sep. 30, 2003

(54) DUPLEX POWDER METAL BEARING CAPS AND METHOD OF MAKING THEM

(75) Inventors: Terry M. Cadle, Wauwatosa, WI (US); Joel H. Mandel, Hartford, WI (US)

(73) Assignee: GKN Sinter Metals, Inc., Germantown, WI (US)

( * ) Notice: Subject to any disclaimer, the term of this patent is extended or adjusted under 35 U.S.C. 154(b) by 0 days.

(21) Appl. No.: 09/889,396

(22) PCT Filed: Feb. 2, 2000

(86) PCT No.: PCT/US00/02662
§ 371 (c)(1),
(2), (4) Date: Jul. 17, 2001

(87) PCT Pub. No.: WO00/46520
PCT Pub. Date: Aug. 10, 2000

(51) Int. Cl.$^7$ ................................................. F16C 17/02
(52) U.S. Cl. ..................... 384/273; 384/279; 384/294; 384/434; 384/902
(58) Field of Search ................................ 384/294, 288, 384/273, 902, 279, 434

(56) References Cited

U.S. PATENT DOCUMENTS

| | | |
|---|---|---|
| 3,665,585 A | 5/1972 | Dunn et al. |
| 3,762,881 A | 10/1973 | Dunn |
| 3,768,327 A | 10/1973 | Dunn et al. |
| 3,772,935 A | 11/1973 | Dunn et al. |
| 4,054,449 A | 10/1977 | Dunn et al. |
| 4,145,798 A | 3/1979 | Sarnes |
| 4,277,544 A | 7/1981 | Pietrocini |
| 4,721,598 A | 1/1988 | Lee |
| 4,772,340 A | 9/1988 | Kawaguchi et al. |
| 5,273,710 A | 12/1993 | Zengin |
| 5,455,000 A | 10/1995 | Seyferth et al. |
| 5,536,089 A | 7/1996 | Weber et al. |
| 5,540,883 A | 7/1996 | Jones et al. |
| 6,017,151 A * | 1/2000 | Heinemann |
| 6,055,884 A * | 5/2000 | Lantz et al. ................. 384/294 |

FOREIGN PATENT DOCUMENTS

| | | |
|---|---|---|
| WO | WO 97/22819 | 6/1997 |
| WO | WO 97/42424 | 11/1997 |

* cited by examiner

Primary Examiner—Lenard A. Footland
(74) Attorney, Agent, or Firm—Quarles & Brady LLP (57) ABSTRACT

A main bearing cap (A') made of powder metal has a body portion (Y) made from one powder metal material (Q), and a bearing arch portion (H), foot joint face portions (S) and/or wings (W) made of a different powder metal material (P). The material (Q) of the body portion (Y) is harder than the material (P) of the other portions (H, S, W), and the material (P) of the other portions (H, S, W) is relatively machinable. For the bearing arch portion (H), the machinability of the material (P) approximately matches the machinability of the bearing support structure (B) to which the bearing cap (A') is assembled to produce a good quality bore and longer tool life during line boring. The bearing arch material (P) may be a bearing material.

19 Claims, 9 Drawing Sheets

DUPLEX POWDER METAL BEARING CAPS AND METHOD OF MAKING THEM

This application is based on, and claims the benefit of, U.S. patent application Ser. No. 09/077,861 filed Jun. 4, 1998 and entitled "DUPLEX SPROCKET/GEAR CONSTRUCTION AND METHOD OF MAKING SAME", now U.S. Pat. No 6,148,685, which claimed the benefit of U.S. Provisional Patent Application No. 60/008,696 filed Dec. 15, 1995.

BACKGROUND OF THE INVENTION

1. Field of the Invention

This invention relates to powder metal articles and their manufacture and in particular to a main bearing cap in which the body is made of a high strength powder metal material and other parts are made with a different more machinable powder metal material which is metallurgically bonded to the body.

2. Discussion of the Prior Art

Figure 1:
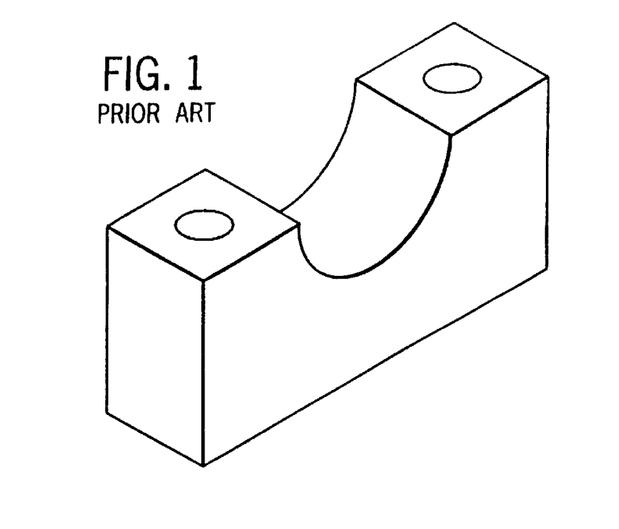
FIG. 1 is a perspective view of a prior art main bearing cap.
Figure 2:
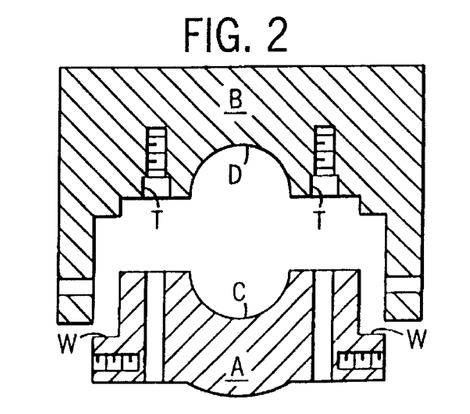
FIG. 2 is a plan view illustrating how a main bearing cap fits into an engine block.
Figure 3:
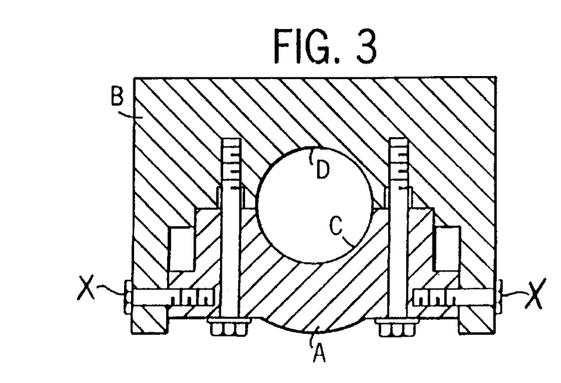
FIG. 3 is a view like FIG. 2, with the cap bolted to the block.

FIG. 1 illustrates a basic shape of a conventional main bearing cap (MBC). It is essentially a solid body with a semi-cylindrical recess and bolt holes for mounting. MBCs are used to retain the shell bearings and crankshaft of internal combustion engines. This is accomplished by bolting the MBC A (FIG. 2) to the lower end of the engine block B (FIG. 2). The semi-cylindrical recess C in the MBC corresponds to a similar semicylindrical recess D in the engine block so as to form a round hole when bolted together as shown in FIG. 3.

Figure 4:
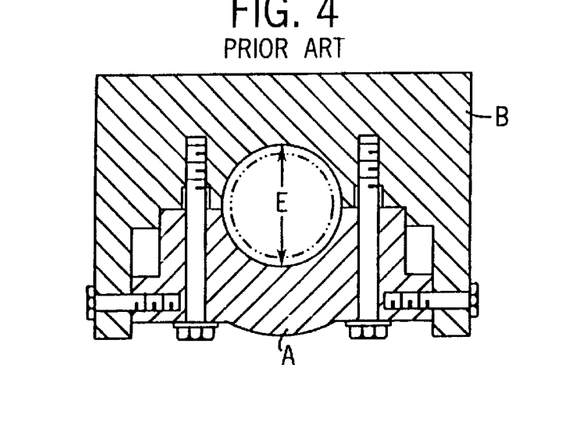
FIG. 4 is a view like FIG. 3, but after the bearing bore has been bored out.
Figure 5:
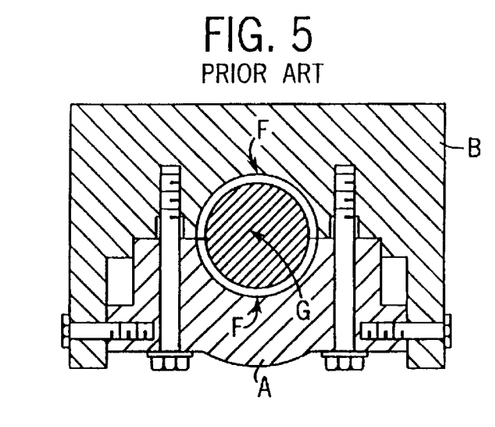
FIG. 5 is a view like FIG. 4, but with shell bearings F and crankshaft G installed.

In multiple cylinder engines, there are multiple MBC/cylinder block holes which are bored-out to a precise diameter E (FIG. 4) to accept bearing shells F (FIG. 5), which in turn locate and retain the crankshaft G (FIG. 5) in place. This boring operation is critical since the roundness and diametral precision have a significant effect on engine noise. A slightly oversize diameter allows the crankshaft to vibrate during operation. This is heard as a "rumble" that is unacceptable in modern passenger vehicles. A slightly undersize or out of round bore can cause binding of the crankshaft, preventing smooth low friction operation.

Traditionally, the cylinder block has been made from either grey cast iron or an aluminum alloy, and the MBCs made from either grey cast iron or ductile cast iron (also called spheroidal or nodular cast iron). In recent years, a new material process combination has become commercially applied, namely a sintered powder metal (P/,M) steel. A principal cost advantage of the P/M steel is the near net shape that can be achieved, which minimizes machining and associated costs of the product.

However, since the MBC has to be bored at the same time as the cylinder block, there is a challenge related to the difference in machinability of the P/M steel and the block material (cast iron or aluminum alloy). This has lead to improvements in the P/M steel material machinability by well known and published means that include additions of machinability aids to the P/M material. This has been beneficial, but not universally successful in matching the MBC and block material machinability. A further issue is the ever increasing development of engine technology that continues to try to obtain more power from smaller (lower weight) and faster turning engines to extend fuel economy and performance respectively.

A natural extension of the MBC technology to handle this added power-density and higher loads is to raise the strength of the P/M steel. This requires that the P/M steel be strengthened by some means, such as heat treatment, as is practiced in conventional steel technology. Heat treatment involves production of a stronger but also much harder steel which is difficult to bore, and results in very short lived and expensive cutting tooling. The short tool life means interrupted engine production on very costly automated machining lines.

Thus, a need exists to match the machinability of the recesses C and D while maintaining a high strength, low weight bearing cap of near net pre-machined shape and dimension.

SUMMARY OF THE INVENTION

The invention provides a two material bearing cap made by powder metallurgy. In one aspect, there is a thin layer of a more machinable material lining the half circular bore of the bearing cap, with a stronger, harder material forming the majority and rest of the body of the bearing cap.

In this aspect, a bearing alloy composition may be used for the softer material in the bore arch region, which may be line bored to produce an integral bearing surface, thereby eliminating the shell bearings which otherwise are used. The integral bearing bore is only possible in bearing caps used in aluminum engine blocks. Whether the more machinable powder material lining the half bore of the bearing cap is a bearing alloy or not, line boring is facilitated and tool life is prolonged by the invention.

Also in this aspect, the material lining the half circular bore of the bearing cap is preferably chosen to match the machinability of the half circular bore of the engine block.

In another aspect, there may be provided a two material bearing cap made by powder metallurgy where there is a thin layer of a softer material on each joint face of the foot of the bearing cap, including where present, integral dowels, with a stronger harder material forming the majority and rest of the body of the bearing cap. By forming the dowels of a softer material, they are more conformable to the counterbore in the engine block in which they are pressed, and better repressed into them during the fit-up and installation of the crankshaft.

In another aspect, the bearing cap may be made with outboard wings for cross-bolting. These wings may be made from a softer, more machinable material, with a stronger harder material forming the majority and rest of the body of the bearing cap.

Each of these aspects may be used alone, or in any combination with one or more of the other aspects.

These and other features and advantages of the invention will be apparent from the detailed description and drawings.

DETAILED DESCRIPTION OF THE PREFERRED EMBODIMENT

Figure 6:
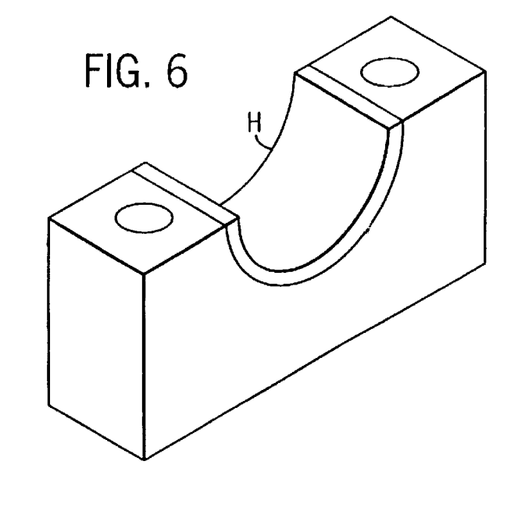
FIG. 6 is a view like FIG. 1, but of a main bearing cap incorporating the invention.
Figure 7:
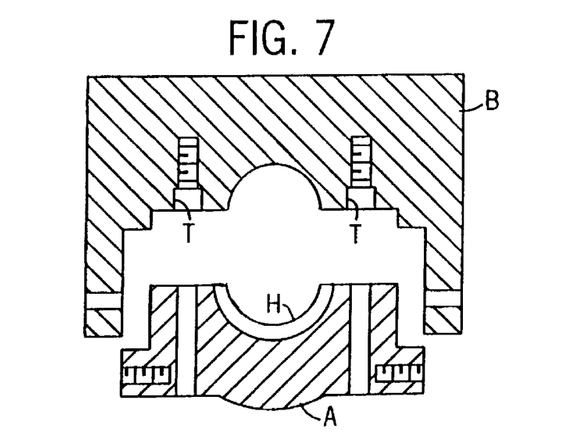
FIG. 7 is a view like FIG. 2, but illustrating a main bearing cap incorporating the invention prior to line boring.
Figure 8:
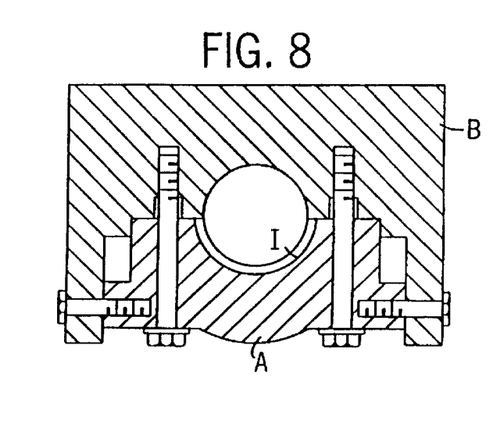
FIG. 8 is a view like FIG. 6, but after bolting and boring.

This invention offers a cost effective technical solution that could only be achieved by powder metallurgy. The invention provides a localized area H (FIGS. 6 and 7) of machinable material in the P/M steel MBC bore which is largely machined away to leave a thin layer I (FIG. 8). In one aspect of the invention, this material is introduced as a separate powder P (FIG. 9), which is poured into the powder compaction die cavity ahead of the regular P/M steel powder Q that forms the bulk (or body) of the MBC.

A technical challenge is to localize the machinable powder P in the desired area. An insufficient thickness of powder P material at any point would lead to the boring tool hitting the harder P/M steel material Q resulting in premature cutting tool failure. An excess thickness of powder material P results in lowering the overall strength of the MBC since the residual P material area is not as strong as the hardened powder Q material. However, the latter condition is preferred since the weakening effect will not be significant provided the relative residual thickness of the softer weaker material P is shallow compared to the bulk material Q thickness.

It would be impossible to exactly match the thickness of P material to the depth of the material bored-out since there are inherent dimensional and locational variations in the boring process that result in different thicknesses being removed from MBC to MBC. A common thickness of material bored-out from the MBC bore is 1mm (0.040 inches) with a variation from cap to cap of about 0.5 mm (0.020 inches). In such a case, therefore, up to 1.25 mm may be removed by boring. The thickness of material P prior to boring, i.e., the thickness of layer H in FIG. 7, may then be targeted to be a minimum of 2 mm and a maximum of 4 mm. This leaves up to 2 mm thickness of material P after boring, i.e., the thickness of layer 1, which compares with typically a minimum of 50 mm of material Q thickness. Thus, the relative thickness of soft material P to hard, strong material Q is only 4%. The strength reduction would therefore be 4% of the difference in strength between the two materials. This is not a functionally significant reduction in strength.

To locate the powder P in the correct location, a press is used in which the individual compaction tooling members have independent motion control, and is preferably a fully computer controlled compaction press. Also, a dual powder handling system is needed to keep the two powders separate until they are in the compaction die cavity, and also to deliver powder P in the correct location and to the correct depth, surrounded by powder Q.

Figure 12:
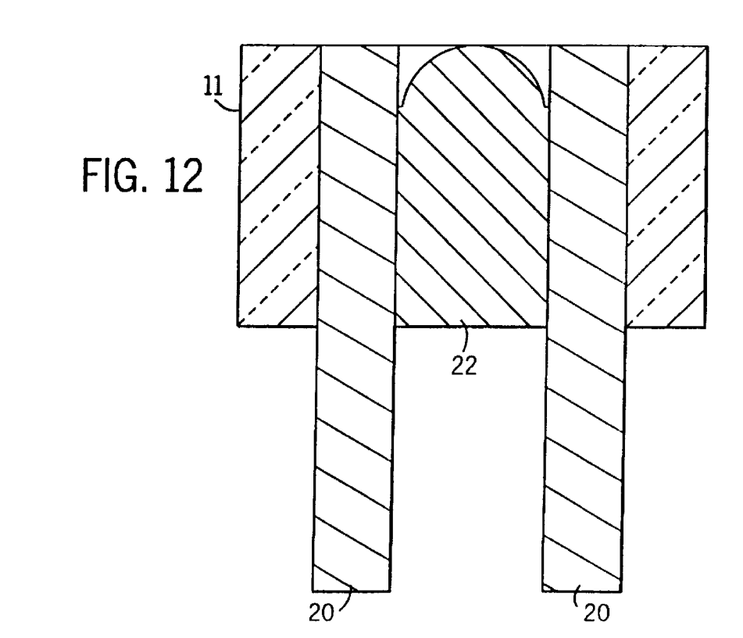
FIG. 12 is a sectional view of a die model from the plane of the line 12—12 of FIG. 13.
Figure 13:
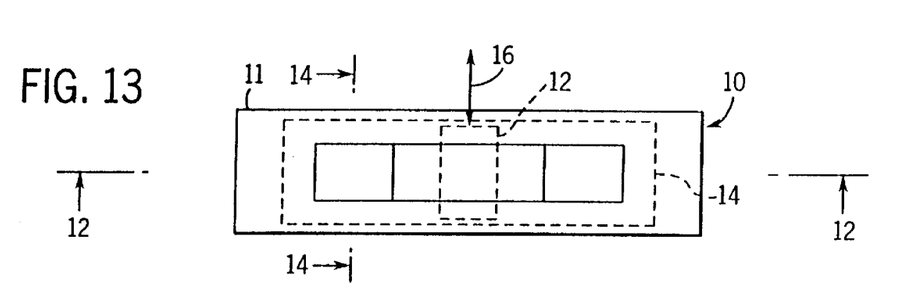
FIG. 13 is a top view of the die model of FIG. 12.
Figure 14:
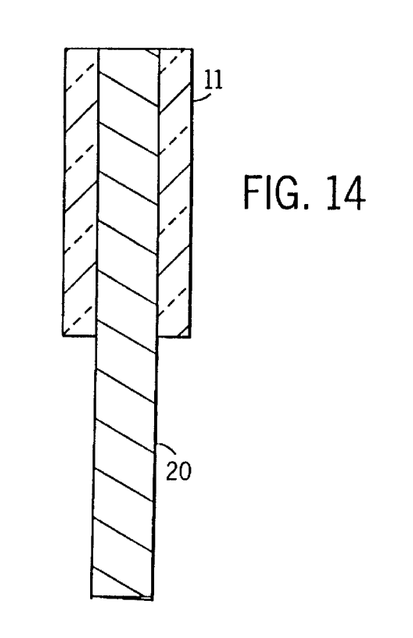
FIG. 14 is a sectional view of a die model from the plane of the line 14—14 of FIG. 13.

Compaction tooling design and dual powder filling were initially researched by use of a clear plastic die model which simulated the production compaction tooling, and where two different colored powders were used to track the initial, transient and final location of the two powders during the powder filling steps and subsequent pre-positioning of the tooling elements for compaction. FIGS. 12–14 show the clear plastic simulated compaction tooling 10. FIG. 13 shows in dashed lines the powder P filling shoe 12 and the powder Q filling shoe 14 in dotted lines. The shoes 12, 14 in their simplest form are open bottom boxes which contain the powder P to be charged into the cavity in die 11. The shoes 12, 14 are moved back and forth over the die cavity in the axial direction indicated by arrow 16. This is the axial direction relative to the bearing cap bore C. In the die cavity are positioned two leg punches 20 and an arch punch 22 between them. The leg punches 20 are movable up and down together. The arch punch 22 is also movable up and down but independently of the leg punches 20. Not illustrated in FIGS. 9A–14 are core rods which would be used for forming the bolt bores through the legs of the bearing cap, although in a production bearing cap those bores would be formed by such core rods.

Figure 9A:
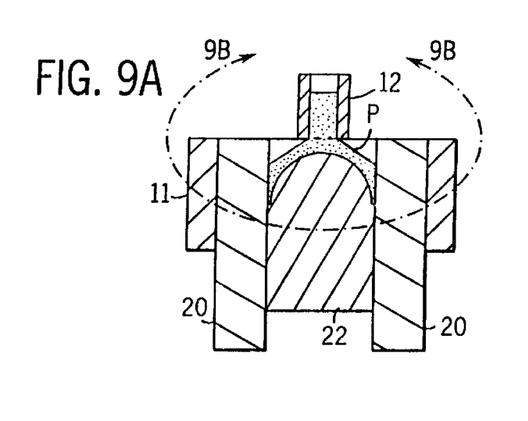
FIG. 9A is a sectional view of a die set-up, like FIG. 12, with a bore lining powder being dispensed into the die cavity.
Figure 9B:
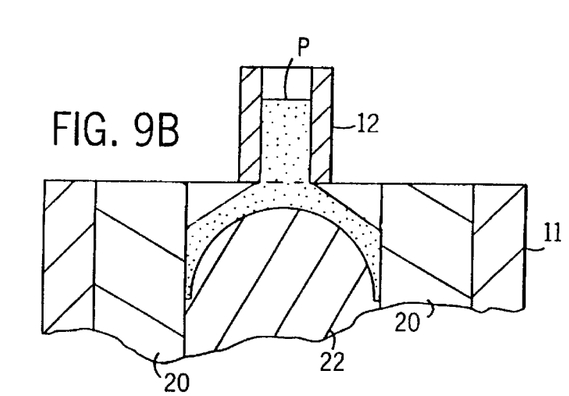
FIG. 9B is a detail view of a portion of FIG. 9A.
Figure 10:
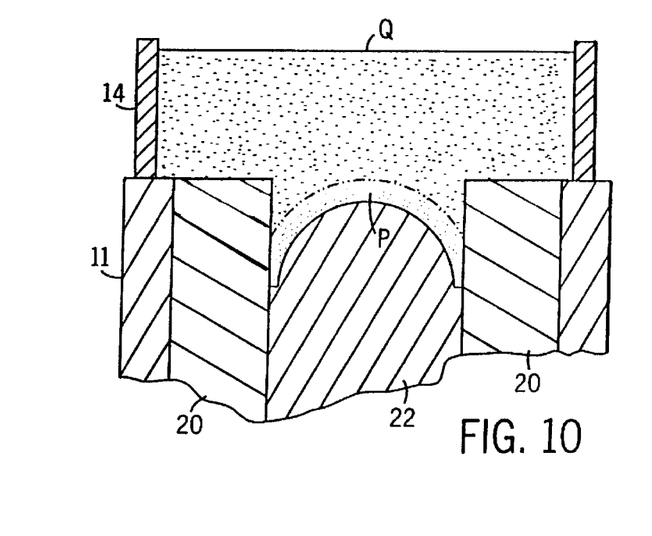
FIG. 10 illustrates the next stage of die filling in which the powder of the cap body is being dispensed into the die.
Figure 11:
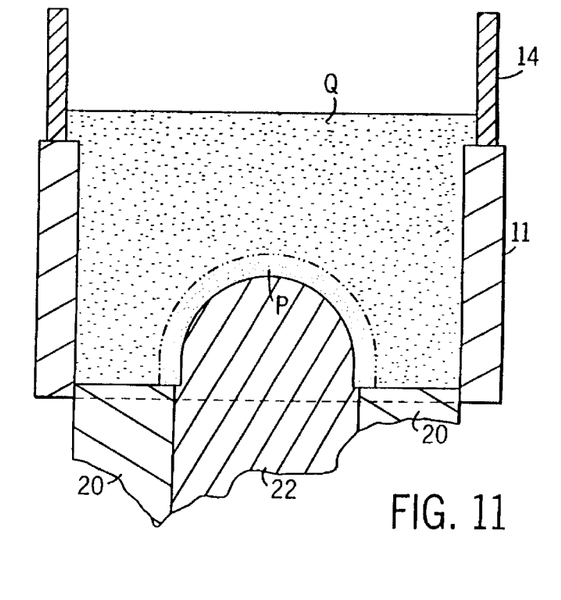
FIG. 11 illustrates the continuation of the filling step of FIG. 10, with the bore and leg punches lowered relative to the die housing.

FIGS. 9A and 9B show the filling of the first powder P, which is relatively machinable powder, into a die set like that shown in FIGS. 12–14. FIGS. 10 and 11 show the distributions of powders P and Q during powder charging and after powder Q has been charged into the die cavity and the tooling elements moved to their final position, prior to the powder compaction stage.

It can be seen that the powder P forms a fairly uniform layer around the bore area. This was the result of finding the optimum initial powder filling pattern and mechanism which results in the desired pre-compaction pattern shown in FIG. 11. This is achieved by positioning the tool elements as shown in FIG. 9 and by using a powder P filling shoe 12 of a specific width. This is shown*in FIG. 9, where powder P forms a shaped profile in cross-section, viewed in the axial direction, which is a flat topped-triangular shape. This shape is dictated by the "angle of repose" of the powder P. This is the natural angle formed when the powder is poured in a narrow stream to form a cone shaped pile.

Using this approach, the width of the feed shoe 12 for powder P is adjusted to form the ideal initial pattern. Then a full width feed shoe containing powder Q is passed over the die cavity such that powder Q falls on top of powder P. filling in the spaces left by the slopes of powder P. Next, the tool elements (the three punches 20 and 22) are moved to their pre-compaction position. It is during this motion that the shape of powder P changes to the ideal shape for subsequent compaction.

Unfortunately, the two colored powders cannot be compacted in the plastic tooling since the plastic would crack under the pressure needed. Therefore, the lessons learned from this stage of development were taken and applied to actual production tooling which is made from high strength tool steels (the punches 20, 22) and tungsten carbide (the die 11). Using the pre-set tool element positions, samples were made from two powders P and Q as described earlier.

Figure 16:
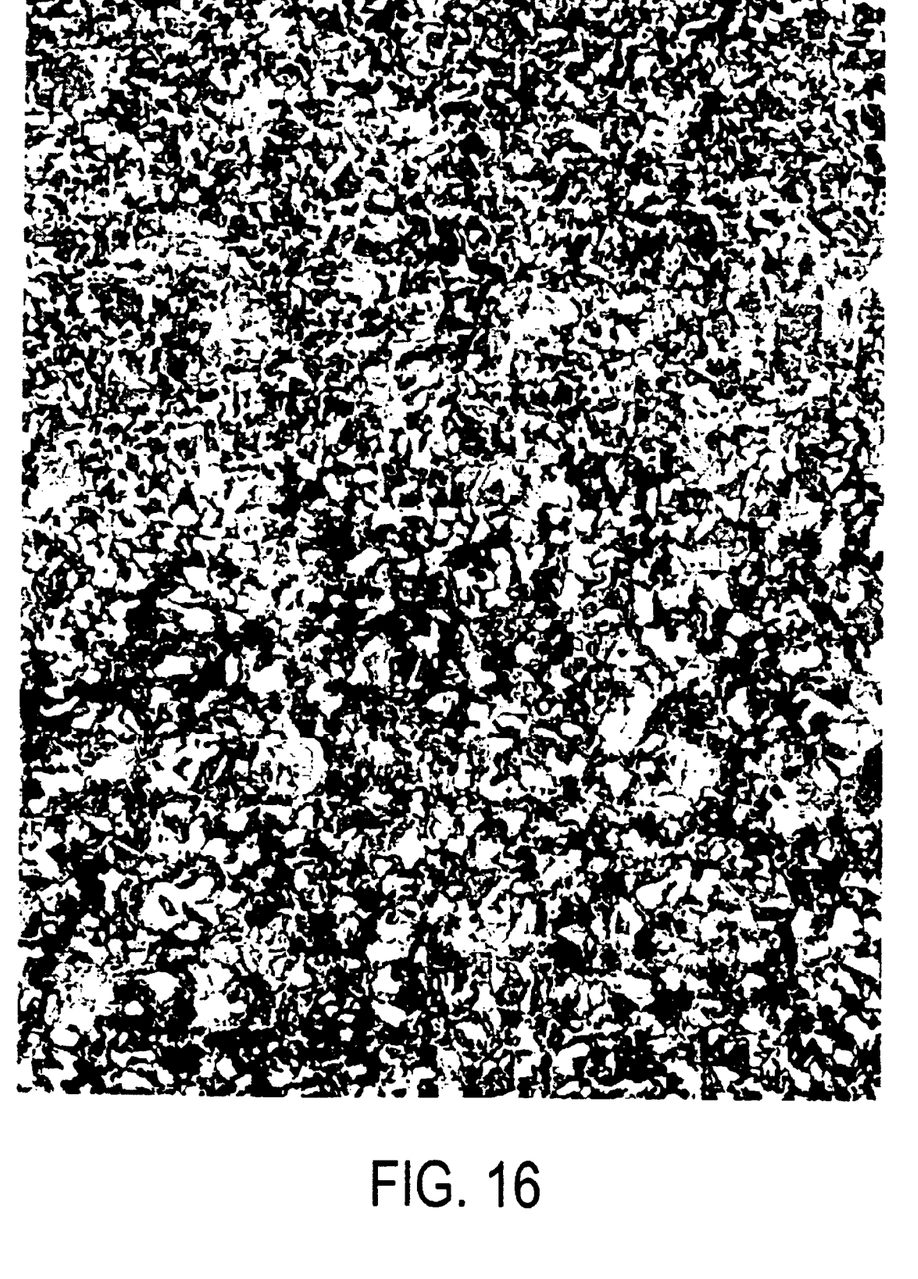
FIG. 16 is a photomicrograph of the boundary of two materials made using the present invention.

After compaction and sintering, the final shape of the two compacted powders P and Q was examined by sectioning the compact and observing the boundary as shown (100× magnification Nital Etch) in the photomicrograph of FIG. 16. The result was that a layer of approximately 2 mm to 4 mm was formed around the bore section, which was the intent of the invention. Repeated trials resulted in sample compacts of MBCs which were sintered (the thermal process that metallurgically bonds the powder particles together) and the resulting MBCs examined for microstructure integrity at the bond zone between the powders P and Q. This was found to be excellent.

In a variation of the invention, the first material P is also located on the joint faces of the legs of the MBC. This is illustrated in FIGS. 15A–H, in which the voids R are filled with the softer powder metal P. to form tapered bosses S (FIG. 15H, also referred to as integral hollow dowels). The tapered bosses S are molded onto the surface of each cap foot as disclosed in commonly owned International Patent Publication No. WO 97/42424, which is hereby incorporated by reference, to locate in a counterbore T (FIG. 2) on the mating bulkhead. Where the main body Y (FIG. 15H) of the MBC needs to be high strength/high hardness, a repressing step to calibrate the diametral size and angle of the integral dowel may be impractical if the dowel is the same material as the body. This is because strong hard P/M steel will not plastically yield to form the ideal geometry, but will either spring back to the original shape, crack due to brittleness, or crack the repressing tool. Therefore, a layer of softer P/M material which includes the integral dowels, formed according to the present invention, enables the repressing process to be realized. Since this region of the MBC is in compression in service due to bolt loading, there is no detriment to the functional strength of the MBC.

Figure 15A:
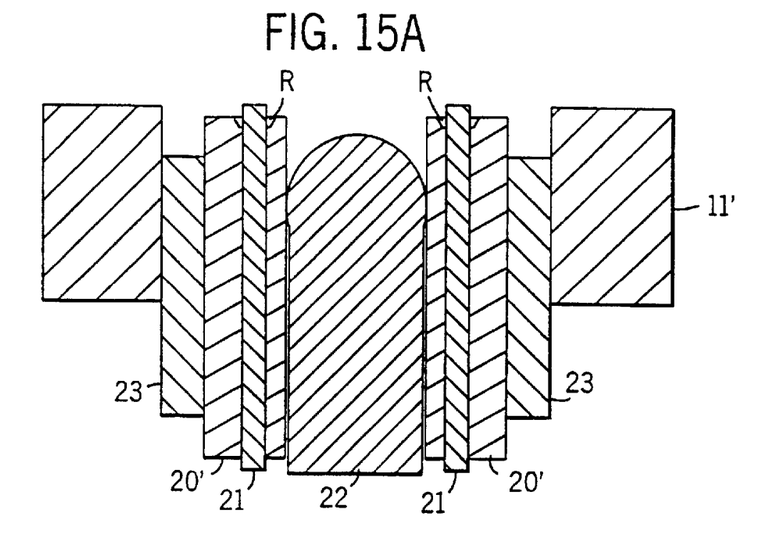
FIGS. 15A–H are views similar to FIGS. 9–11 illustrating a die filling sequence for forming softer wings in a bearing cap.
Figure 15B:
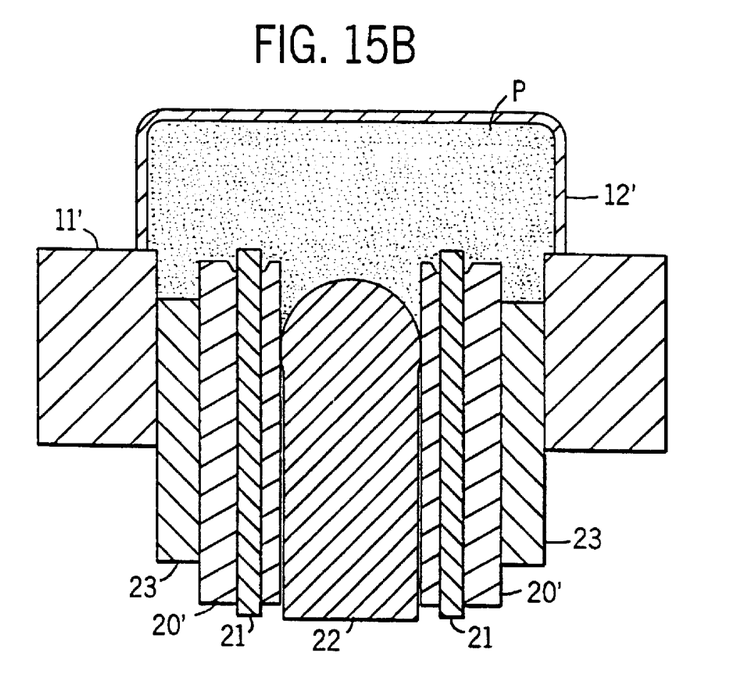
Figure 15C:
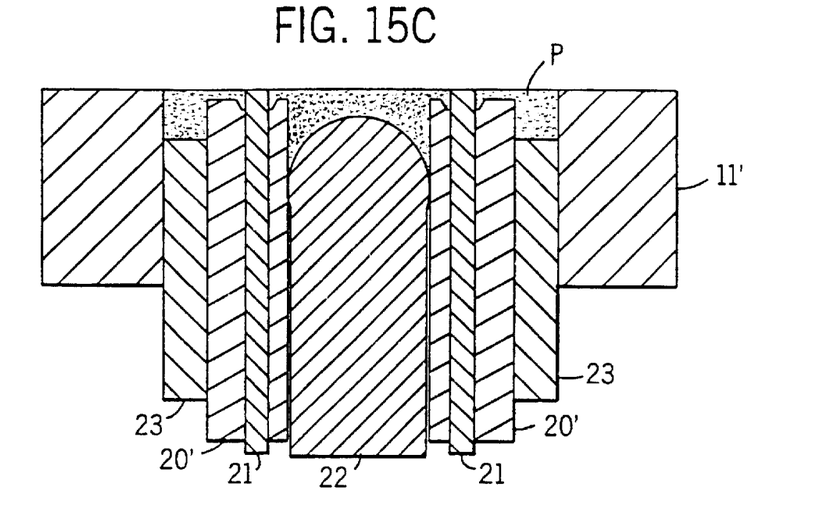
Figure 15D:
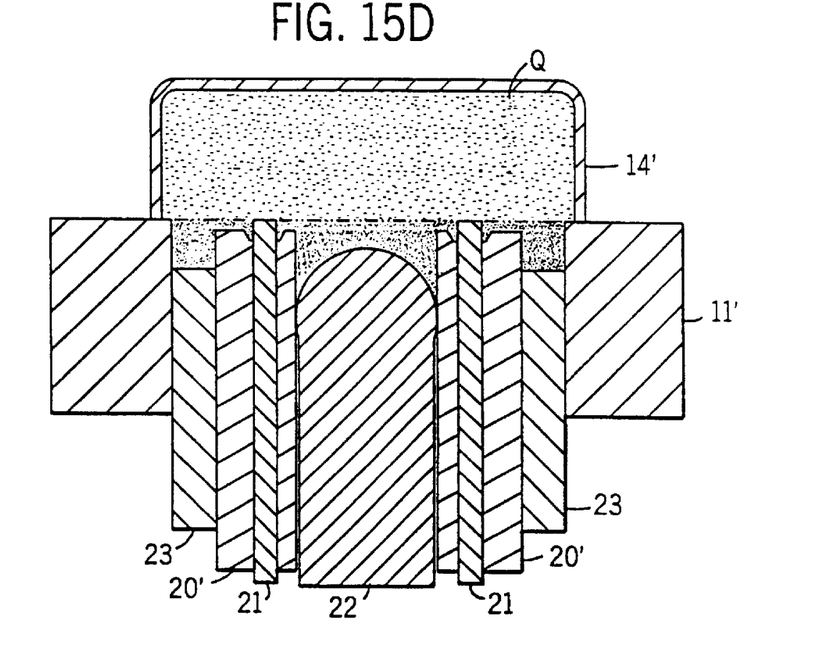
Figure 15E:
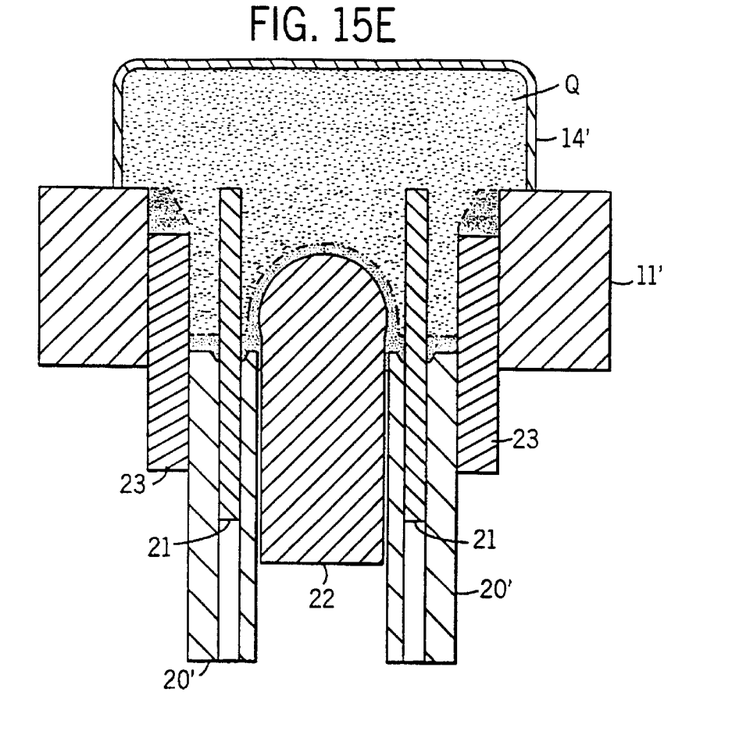
Figure 15F:
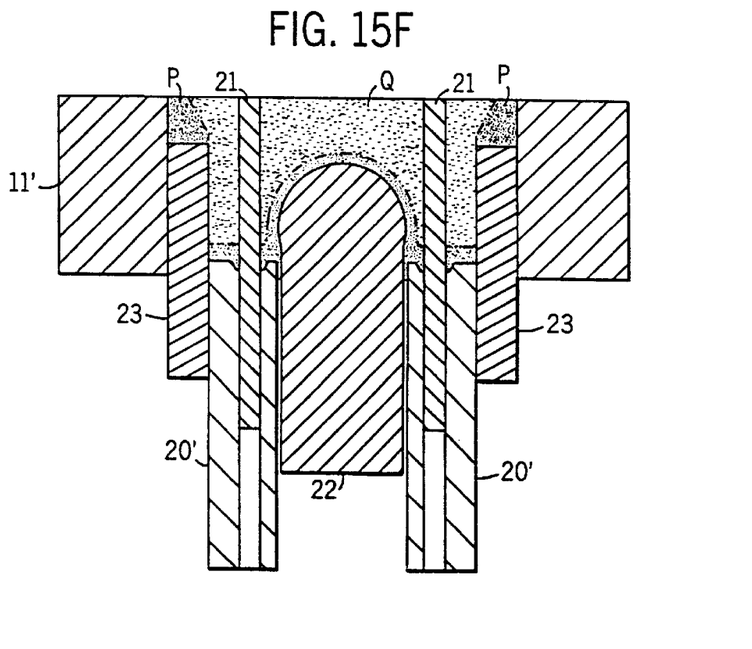
Figure 15G:
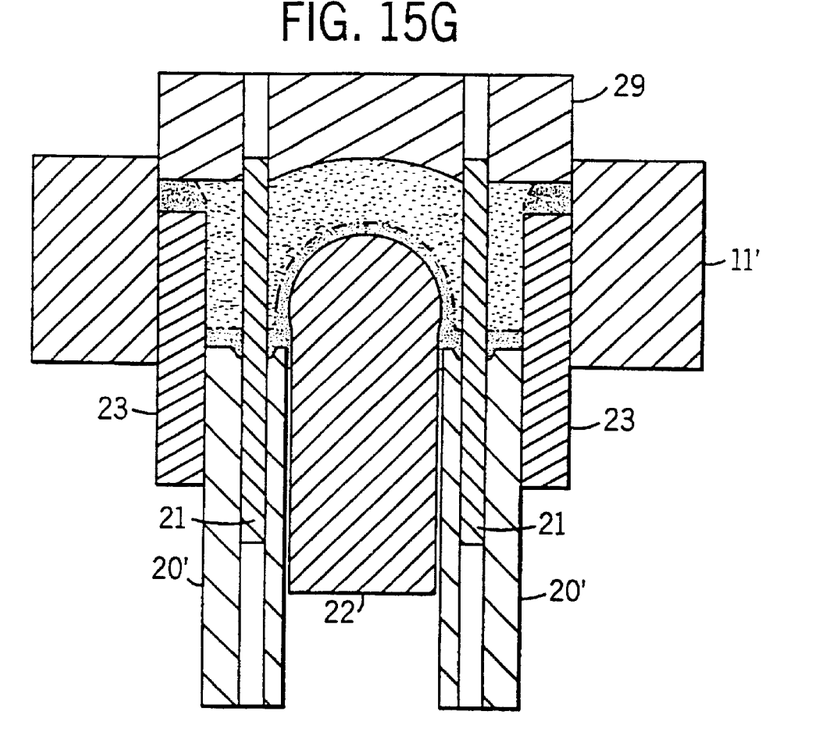
Figure 15H:
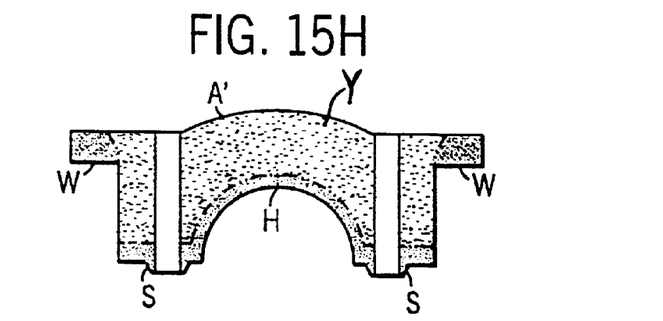

In a third example of the invention, the MBC design includes extended wings W (FIG. 2) that are bolted by bolts X (FIG. 3) horizontally to the cylinder block to provide rigidity and quietness. This design is called "cross bolted" and is gaining in popularity. Unfortunately, the design demands that the material of the wings be machinable to accept a tapped hole which receives the bolt threads. Strong hard P/M steel with a bainite or martensite structure is extremely difficult to drill and tap. Drill-bit life and tap life would be uneconomical. To overcome this problem, the invention proposes to make the wings W from the softer machinable powder material P. FIG. 15A shows the initial tool set position ready to receive the soft powder P. The tool set includes bore punch 22, leg punches 20', core rods 21 inside the leg punches 20', and wing punches 23, all inside die 11'. FIG. 15B shows the powder P filling device 12', which is essentially an inverted open bottom box containing powder P over the tool set. FIG. 15C shows the condition after the powder fill box is withdrawn, thereby strickling (scraping excess powder off) the surface. FIG. 15D shows the second powder fill box 14' containing powder Q over the tool set. FIG. 15E shows the tooling moved to the final filling position which draws powder Q into the tool set. FIG. 15F shows the condition where the second powder fill box 14' has withdrawn and strickled off the surface. The upper punch is also shown in FIG. 15G, ready to advance and compact the powders. FIG. 15G shows the compaction completion, with upper punch 29 compacting the powders in the die 11', and FIG. 15H shows the dual material compact A' after ejection from the tooling, with softer half bore H, softer bosses S and softer wings W.

In a fourth application of the invention, the machinable material P would be made from a powder metal bearing material. In this case, it would be possible to dispense with the traditional shell bearings, and use the bearing cap bore layer material as the bearing surface for the crankshaft. In this instance, the mating surface of the cylinder block would be the other half of the bearing. Since the cylinder block half of the bearing has much lower loads to bear (the combustion stroke is directed away from this surface), then the parent block material would be adequate for at least low to medium duty engines. There is a significant cost savings in eliminating these half shell bearings.

The main bearing cap compact A' is, of course, sintered to bind the powder particles together. Any suitable sintering process may be used. The result is the finished or near finished main bearing cap A', with the powder metal distributions as illustrated in FIG. 15H. The bearing cap A' is finished at this point unless some subsequent resizing, heat treating or surface finishing operations are needed to finish it.

In any of these constructions, the body Y material Q may be partially or fully hardened during or after sintering to a bainitic and/or martensitic microstructure, but the soft material P is chosen such that it does not respond to the hardening process remaining soft and machinable.

For the particular materials to make a bearing cap of the invention, the softer, more machinable powder material P may be a low to medium carbon powder metal steel (e.g., 0–0.7% carbon) containing a machinability aid including but not restricted to one or more of copper above 3%, manganese sulfide up to 1%, boron nitride (non-cubic) up to 0.2%, magnesium silicate up to 1%, and calcium fluoride up to 1%. The harder body material Q may be a 0.45–0.65% carbon, 0.45–0.65% phosphorus, 2–4% copper powder metal steel, or a 0.3–0.7% carbon, 0.3% copper steel.

Many modifications and variations to the preferred embodiments described will be apparent to those skilled in the art. Therefore, the invention should not be limited to the embodiments described, but should be defined by the claims which follow.

We claim:

1. In a bearing cap to be bolted to a bearing support structure so as to define a bearing bore between a bore arch of said cap and said structure and in which bolt holes for securing said cap to said structure extend through feet of said cap and into said structure, said cap having at least two of said feet, one said foot on each side of said bore arch with at least one bolt hole extending through each said foot, the improvement wherein:

said cap is made from at least two different sintered powder metal materials and one of said powder metal materials is harder than the other, and said harder material is selected from the group consisting of: a powder metal steel containing 0.45–0.65% carbon, 0.45–0.65% phosphorus and 2–4% copper; and a powder metal steel containing 0.3–0.7% carbon and 0–3% copper.

2. In a bearing cap to be bolted to a bearing support structure so as to define a bearing bore between a bore arch of said cap and said structure and in which bolt holes for securing said cap to said structure extend through feet of said cap and into said structure, said cap having at least two of said feet, one said foot on each side of said bore arch with at least one bolt hole extending through each said foot, the improvement wherein:

said cap is made from at least two different sintered powder metal materials and one of said powder metal materials is softer than the other.

3. The improvement of claim 2, wherein the softer powder metal material is positioned adjacent to said bore arch.

4. The improvement of claim 3, wherein the machinability of said softer powder metal material approximately matches the machinability of said bearing support structure adjacent to said bore.

5. The improvement of claim 3, wherein said softer powder metal material is also positioned on joint faces of said feet.

6. The improvement of claim 5, wherein integral dowels are formed on said joint faces of said feet, and said integral dowels are made of said softer powder metal material.

7. The improvement of claim 2, wherein wings extend from ends of said bearing cap, and said wings are formed from said softer powder metal material.

8. The improvement of claim 7, wherein said softer powder metal material is also positioned on joint faces of said feet.

9. The improvement of claim 8, wherein integral dowels are formed on said joint faces of said feet, and said integral dowels are made of said softer powder metal material.

10. The improvement of claim 2, wherein said softer material is a low to medium carbon powder metal steel having 0–0.7% carbon and contains a machinability aid.

11. The improvement of claim 10, wherein said machinability aid is one or more materials selected from the group consisting of: copper above 3%; manganese sulfide up to 1%; non-cubic boron nitride up to 0.2%; magnesium silicate up to 1%; and calcium fluoride up to 1%.

12. In a bearing cap to be bolted to a bearing support structure so as to define a bearing bore between a bore arch of said cap and said structure and in which bolt holes for securing said cap to said structure extend through feet of said cap and into said structure, said cap having at least two of said feet, one said foot on each side of said bore arch with at least one bolt hole extending through each said foot, the improvement wherein:

said cap is made from at least two different sintered powder metal materials and one of said materials is hardened and the other material remains soft.

13. The improvement of claim 1 wherein said hardened material is hardened to a martensitic microstructure.

14. The improvement of claim 1, wherein said hardened material is hardened to a bainitic microstructure.

15. In a bearing cap to be bolted to a bearing support structure so as to define a bearing bore between a bore arch of said cap and said structure and in which bolt holes for securing said cap to said structure extend through feet of said cap and into said structure, said cap having at least two of said feet, one said foot on each side of said bore arch with at least one bolt hole extending through each said foot, the improvement wherein:

said cap is made from at least two different sintered powder metal materials and said two materials differ in hardness, a body of said bearing cap is made of the harder one of said materials and an exposed surface of said bearing cap is made of the softer one of said materials.

16. The improvement of claim 15, wherein said surface made of the softer powder metal material is a bore arch of said bearing cap.

17. The improvement of claim 16, wherein said softer powder metal material is also positioned on joint faces of said feet.

18. The improvement of claim 17, wherein integral dowels are formed on said joint faces of said feet, and said integral dowels are made of said softer powder metal material.

19. The improvement of claim 18, wherein wings extend from ends of said bearing cap, and said wings are formed from said softer powder metal material.

* * * * *

UNITED STATES PATENT AND TRADEMARK OFFICE
CERTIFICATE OF CORRECTION

PATENT NO. : 6,626,576 B1
DATED : September 30, 2003
INVENTOR(S) : Cadle et al.

It is certified that error appears in the above-identified patent and that said Letters Patent is hereby corrected as shown below:

Column 1,
Line 10, please insert the following:
-- This claims the benefit of U.S. Provisional Patent Application No. 60/118,333 filed February 3, 1999. --.
Line 48, "(P/,M)" should be -- (P/M) --.

Column 3,
Line 53, "imm" should be -- 1mm --.
Line 60, "1" should be -- I --.

Column 4,
Line 43, "shown*in" should be -- shown in --.

Signed and Sealed this

Twenty-second Day of June, 2004

JON W. DUDAS
*Acting Director of the United States Patent and Trademark Office*